United States Patent
Bestgen et al.

(10) Patent No.: US 9,734,177 B2
(45) Date of Patent: *Aug. 15, 2017

(54) INDEX MERGE ORDERING

(71) Applicant: International Business Machines Corporation, Armonk, NY (US)

(72) Inventors: Robert J. Bestgen, Rochester, MN (US); Michael W. Cain, Rochester, MN (US); Thomas O. McKinley, Rochester, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 205 days.

This patent is subject to a terminal disclaimer.

(21) Appl. No.: 14/505,275

(22) Filed: Oct. 2, 2014

(65) Prior Publication Data

US 2015/0363470 A1 Dec. 17, 2015

Related U.S. Application Data

(63) Continuation of application No. 14/302,584, filed on Jun. 12, 2014.

(51) Int. Cl.
*G06F 17/30* (2006.01)

(52) U.S. Cl.
CPC .... *G06F 17/30315* (2013.01); *G06F 17/3053* (2013.01); *G06F 17/30321* (2013.01); *G06F 17/30528* (2013.01); *G06F 17/30867* (2013.01)

(58) Field of Classification Search
CPC ......... G06F 17/30315; G06F 17/30321; G06F 17/30528; G06F 17/3053; G06F 17/30867
See application file for complete search history.

(56) References Cited

U.S. PATENT DOCUMENTS

| | | | | |
|---|---|---|---|---|
| 5,918,225 A | * | 6/1999 | White | G06F 17/30324 |
| 7,343,367 B2 | * | 3/2008 | Muras | G06F 17/30433 |
| 2007/0011143 A1 | * | 1/2007 | Fuh | G06F 17/30864 |
| 2010/0030796 A1 | * | 2/2010 | Netz | G06F 17/30501 |
| | | | | 707/756 |

(Continued)

OTHER PUBLICATIONS

Sybase, Inc.; "Performance and Tuning: Basics"; Aug. 2003, pp. 1-432; <http://infocenter.sybase.com/help/index.jsp?topic=/com.sybase.dc20020_1251/html/databases/X16374.htm>.

(Continued)

*Primary Examiner* — Apu Mofiz
*Assistant Examiner* — Jared Bibbee
(74) *Attorney, Agent, or Firm* — Patterson + Sheridan, LLP

(57) ABSTRACT

Method to order query results, by processing a received query at least in part using a composite key index, wherein the composite key index comprises at least two key columns, wherein the at least two key columns comprise at least one pre-ordering column and an ordering column, wherein the query specifies ordering criteria to order a result set based on values of the ordering column, wherein the processing comprises receiving, from the composite key index, an ordering column value for each unique pre-ordering column value in the composite key index, identifying a first ordering column value as being ordered first according to the ordering criteria, and returning the first ordering column value as being responsive to the query.

12 Claims, 6 Drawing Sheets

(56) References Cited

U.S. PATENT DOCUMENTS

| | | | | |
|---|---|---|---|---|
| 2010/0088309 A1* | 4/2010 | Petculescu | ............ | G06F 17/3048 707/714 |
| 2010/0262593 A1* | 10/2010 | Bruno | ............... | G06F 17/30312 707/715 |
| 2011/0289091 A1* | 11/2011 | Collins | .................. | G06Q 10/10 707/741 |
| 2013/0018890 A1* | 1/2013 | Rajan | ................ | G06F 17/30336 707/741 |
| 2013/0226940 A1* | 8/2013 | Gorelik | ............. | G06F 17/30292 707/754 |
| 2014/0108459 A1* | 4/2014 | Gaza | ................. | G06F 17/30584 707/792 |

OTHER PUBLICATIONS

Sybase, Inc.; "Performance and Tuning: Basics"; Aug. 2003, pp. 312-314; <http://infocenter.sybase.com/help/index.jsp?topic=/com.sybase.dc20020_1251/html/databases/X16374.htm>.

U.S. Appl. No. 14/302,584, entitled "Index Merge Ordering", filed Jun. 12, 2014.

"List of IBM Patents or Patent Applications Treated as Related".

* cited by examiner

| City 101 | MemberID 102 |
|---|---|
| Rochester | 10201 |
| Rochester | 24921 |
| Rochester | 72910 |
| Chapel Hill | 09184 |
| Chapel Hill | 10001 |
| Chapel Hill | 39222 |
| Apex | 09999 |
| Apex | 55101 |
| Apex | 88221 |
| Armonk | 01010 |
| Armonk | 10002 |
| Armonk | 47210 |

| City 101 | MemberID 102 |
|---|---|
| Armonk | 01010 |
| Chapel Hill | 09184 |
| Apex | 09999 |
| Chapel Hill | 10001 |
| Armonk | 10002 |
| Rochester | 10201 |
| Rochester | 24921 |
| Chapel Hill | 39222 |
| Armonk | 47210 |
| Apex | 55101 |
| Rochester | 72910 |
| Apex | 88221 |

Page 1 2.. 5 Next Last
110

FIG. 1B

INDEX MERGE ORDERING

CROSS-REFERENCE TO RELATED APPLICATION

This application is a continuation of co-pending U.S. patent application Ser. No. 14/302,584, filed Jun. 12, 2014. The aforementioned related patent application is herein incorporated by reference in its entirety.

BACKGROUND

The present disclosure relates to computer databases, and more specifically, to index merge ordering to combine processing of mismatched filtering and ordering criteria into a single operation.

Applications may display data to users that is ordered according to some criteria, such as by dates, alphabetical order, or numerical values. In many cases, the data is a list of results retrieved by executing database queries. Traditionally, to return such results, programmers have either sorted the returned column data, or used an index keyed over the ordering column(s). When there are a large number of rows in the result set, an index is generally preferred as it provides a way to show the initial set of data to the user without having to sort the entire answer set. However, when the query includes unrelated search criteria (for example in an SQL WHERE clause) that will reject a lot of records from going into the result set, the index approach degrades quickly, as potentially a large number of entries in the index may be examined, and rejected, prior to producing enough selected data to display to the user.

A sort needs to process all rows in the result set. Thus, a sort has traditionally been used in cases where there are a relatively small number of rows in the result set. When the result set is large, however, all rows must be processed and sorted, even though the user may only be interested in the first few ordered rows. The processing performance in this regard may therefore be wasteful and undesirable.

SUMMARY

Embodiments disclosed herein include at least a system, method, and computer program product to order query results, by processing a received query at least in part using a composite key index, wherein the composite key index comprises at least two key columns, wherein the at least two key columns comprise at least one pre-ordering column and an ordering column, wherein the query specifies ordering criteria to order a result set based on values of the ordering column, wherein the processing comprises receiving, from the composite key index, an ordering column value for each unique pre-ordering column value in the composite key index, identifying a first ordering column value as being ordered first according to the ordering criteria, and returning the first ordering column value as being responsive to the query.

BRIEF DESCRIPTION OF THE SEVERAL VIEWS OF THE DRAWINGS

FIGS. 1A-1B illustrate techniques to provide index merge ordering, according to one embodiment.

DETAILED DESCRIPTION

Embodiments disclosed herein enable a database index (or other objects providing search and ordering ability) to be used for searching and ordering of results. Specifically, embodiments disclosed herein leverage composite key indexes (indexes with more than one column in their key definition) to search and order results. Generally, when accessing a composite key index, the returned values of the second key column are ordered for each unique value of the first key column. Stated differently, for each of x unique values of a first key column, the key column values of the second key column for a given x value are ordered. While first and second key columns are stated, the solution generically extends to any m number of pre-ordering key columns and any n number of ordering key columns. Embodiments disclosed herein use the first m key columns of the index for the search criteria, while the subsequent key columns are used for ordering (or sorting).

Initially, embodiments disclosed herein access the index to retrieve the unique values from the first m key columns, which provides a starting position for each subsequent sorted key. From those starting positions in the index, embodiments disclosed herein begin a merge process by extracting the first value from each starting position. The merge chooses the "winner" (or record ordered first according to the sort criteria), returns that winner to the user, and moves to determine the next entry in that winner's list. The merge process continues for a predefined duration, such as until a specified count of sorted results are returned.

As used herein, "pre-ordering columns" refers to the first columns in a composite key index that precede the first "ordering column" and are normally used for searching, while "ordering columns" are columns in the composite key index whose values should be sorted according to a predefined sorting criterion. Generally, there may be any number of pre-ordering and ordering columns in the key definition of a composite key index.

Figure 1A:

FIG. 1A depicts a logical representation 100 of values returned by searching a composite index, according to one embodiment. As shown, the values include data from two database columns, namely a city column 101, and a MemberID column 102. The columns 101, 102 may be stored in a database table named member_data, and the columns 101, 102 may be used to build a composite index (not shown) on these columns. In at least one embodiment, the logical representation 100 of data is obtained by probing the composite index to return a set of results matching criteria specified in a query, such as a structured query language (SQL) query. Additional rows of data may be present in the composite index, but not depicted in FIG. 1A for the sake of clarity. For example, and without limitation, the query may take the form of:

```
select * from member_data
where city IN ('Chapel Hill', 'Rochester', 'Apex', 'Armonk')
order by MemberID
```

The logical representation 100 of data may therefore reflect an intermediate result set returned by a database management system (DBMS) when searching the above query against the composite index. However, the DBMS has not yet ordered the resulting data by MemberID. Traditionally, the DBMS would have to sort the depicted results from the composite index 100 in a subsequent step to order the results by MemberID, as specified by the query.

FIG. 1B illustrates a sample graphic user interface (GUI) 103 implementing techniques to provide index merge ordering, according to one embodiment. The GUI 103 reflects the result of using a composite index to search and order the results. As shown, the GUI 103 includes a table 105 of results produced by executing the example query above. Specifically, the data in the table 105 is sorted by the MemberID column 102 (in ascending order, from smallest value to greatest value). Embodiments disclosed herein leverage the fact that as shown in FIG. 1A, the MemberID 102 values are sorted for each unique city value 101. Specifically, as shown in FIG. 1A, the MemberID values for the city of Chapel Hill are sorted as 09184, 10001, and 39222. Likewise, the MemberID values for Rochester, Apex, and Armonk are sorted as 10201, 24921, and 72910, 09999, 55101, and 88221, and 01010, 10002, and 47210, respectively. However, the results are not sorted by the MemberID column 102 across all rows.

In some cases, users wish only to view the 'first screen' of rows (i.e., a portion of the rows) from the entire result set. For example, users may only wish to see their most recent transactions, and do not care to see older transactions. In order to meet these requirements, embodiments disclosed herein use the index to both search and order results. Because the results in FIG. 1A are ordered by MemberID within each unique city (producing a set of ordered sub-lists for each unique city), embodiments disclosed herein may retrieve the first entry in the composite index corresponding to each unique city. Specifically, the DBMS may request the first result for each selected unique city in the index. The rows returned by requesting the first result for each unique city in the index may include 'Rochester' '10201', 'Chapel Hill' '09184', 'Apex' '09999', and 'Armonk' '01010'. Embodiments disclosed herein may temporarily store these results in a result list (not shown), and determine which MemberID value is the lowest (to satisfy the ascending 'order by' criteria). Of the four results, the DBMS may determine that the lowest MemberID value is 01010, corresponding to the first 'Armonk' city entry. The DBMS may then return this row to the user, which is displayed in the GUI 103. The DBMS may then retrieve the next index value with 'Armonk' as the city, namely 'Armonk' '10002' and replace the 'Armonk' '01010' result in the result list. The DBMS may then select the lowest MemberID from the result list, and return it to the user. As shown, the DBMS returns 'Chapel Hill' '09184' to the user, as it includes the lowest MemberID value of the four rows in the result list. The DBMS may continue to merge the ordered lists in FIG. 1A to produce the answer set depicted in table 105, which is ordered completely by MemberID.

As shown, the GUI 103 includes result controls 110, which allows the user to navigate between pages of results. Generally, embodiments disclosed herein may initially return the first page (or set) of results, as depicted in the table 105. However, embodiments disclosed herein may continue the merging of the ordered sub-lists in the index data, filling a buffer with results. If the user requests a second page of results, the DBMS may return the results, and fill the buffer with a third page of results. The process may continue so long as there is data to return, and the user continues to request additional results.

Prior to performing the merge techniques described above, the DBMS may determine whether it is advantageous to perform the merge processing as part of generating a query execution plan. This is because as the number of sub-lists grow, the merge operation may become slower and slower. At some point, the number of sub-lists becomes unwieldy, or at a minimum, provides no advantage to a traditional sort. The traditional sort may include an index probe, a table probe, a temporary sorted list, a sorted list scan, and a final select based on the selection criteria. In order to determine whether to implement the merge techniques described above as part of the query execution plan, the DBMS (by a query plan optimizer), may consider the cardinality of the pre-order column (such as the city column 101). The number of unique values in the pre-order column dictates how many ordered sub-lists exist in the index. If the cardinality of the pre-order columns is low, the number of sub-lists is low, and the merge process may be efficient. Furthermore, if selection can be used for probing, the cardinality becomes even less, since the probes will reject some of the unique values in the index. So the cardinality of the pre-order column is the worst case, while the probe provides the best case.

For example, for the above query, we may assume that the number of unique cities in the city column 101 is 1000. The cardinality of the city column (1000 values) is therefore the worst case scenario for the number of ordered sub-lists. However, the query specifies only four distinct cities, namely Chapel Hill, Apex, Rochester, and Armonk. Therefore, probing the index using the IN list results in at most four ordered sub-lists to merge (as shown in FIG. 1A). In some embodiments, the DBMS may implement a hard threshold for the cardinality of the pre-order column values. For example, if the threshold is 5 unique cities in the city column 101, since the query only requires 4 unique cities to process, the merge process may be implemented. In other embodiments, the DBMS may consider a ratio of the cardinality of the pre-order list to all of the rows in the index (or underlying data tables). If the ratio is below a specified threshold, the DBMS may perform the merge as described herein.

Generally, the pre-order column process may occur with or without any selection criteria. The criteria for deciding whether an index may be used for ordering using pre-order columns is always based on the cardinality of the unique pre-order column values, and is therefore independent of the selection criteria. However, practical use cases involve selection criteria. Probing the index lowers the cost (cardinality) of the index, but does not dictate whether the index can functionally be used. The main criteria in determining whether to merge as described herein is that the pre-order column should have a low enough cardinality to make the merge process effective.

For example, and without limitation, the query may specify:

---
select * from member_data
order by MemberID

---

Based on the composite index (city, MemberID) as shown above, the city column would be the pre-order column in the composite index. The merge process detailed herein may utilize the index for ordering, if the cardinality of the city column is relatively low. If the cardinality of the unique city column values is slow, the merge can work against the index and produce fast (first IO) performance. Such query plans may therefore be extended to any case where a 'good enough' index exists, and the pre-ordering column cardinality is sufficiently small.

Furthermore, the index may be used for search and sort even if the index contains more than two keys. There may be any number of pre-ordering columns, and any number of ordering columns. Embodiments disclosed herein may consider the pre-ordering columns as one big field with n number of distinct values, just as they are considered one big field for a key probe. Equal predicates, however, are a special case of this concept. Because an equal predicate results in just one distinct value, there is only one sub-list, making the merge step unnecessary.

Figure 2:
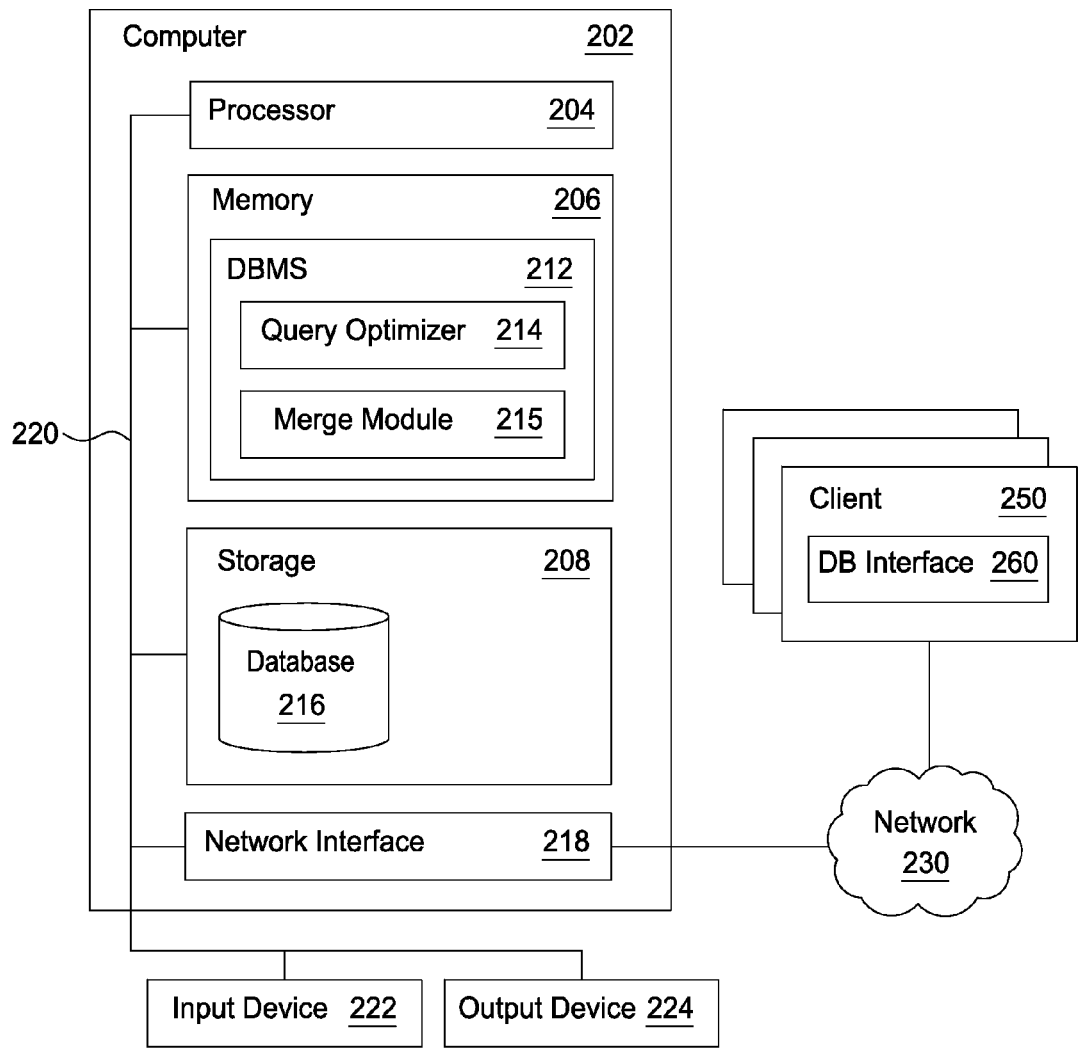
FIG. 2 illustrates a system to provide index merge ordering, according to one embodiment.

FIG. 2 illustrates a system 200 to provide index merge ordering, according to one embodiment. The networked system 200 includes a computer 202. The computer 202 may also be connected to other computers via a network 230. In general, the network 230 may be a telecommunications network and/or a wide area network (WAN). In a particular embodiment, the network 230 is the Internet.

The computer 202 generally includes a processor 204 connected via a bus 220 to a memory 206, a network interface device 218, a storage 208, an input device 222, and an output device 224. The computer 202 is generally under the control of an operating system (not shown). Examples of operating systems include the UNIX operating system, versions of the Microsoft Windows operating system, and distributions of the Linux operating system. (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both.) More generally, any operating system supporting the functions disclosed herein may be used. The processor 204 is included to be representative of a single CPU, multiple CPUs, a single CPU having multiple processing cores, and the like. The network interface device 218 may be any type of network communications device allowing the computer 202 to communicate with other computers via the network 230.

The storage 208 may be a persistent storage device. Although the storage 208 is shown as a single unit, the storage 208 may be a combination of fixed and/or removable storage devices, such as fixed disc drives, solid state drives, SAN storage, NAS storage, removable memory cards or optical storage. The memory 206 and the storage 208 may be part of one virtual address space spanning multiple primary and secondary storage devices.

The input device 222 may be any device for providing input to the computer 202. For example, a keyboard and/or a mouse may be used. The output device 224 may be any device for providing output to a user of the computer 202. For example, the output device 224 may be any conventional display screen or set of speakers. Although shown separately from the input device 222, the output device 224 and input device 222 may be combined. For example, a display screen with an integrated touch-screen may be used.

As shown, the memory 206 includes a database management system (DBMS) 212, which is an application configured to allow for the definition, creation, querying, updating, and administration of databases, such as the database 216. As shown, the DBMS 212 includes a query optimizer 214 and a merge module 215. The query optimizer 214 is an application generally configured to analyze queries received by the DBMS 212 and create a query execution plan for the query. The query optimizer 214 attempts to determine the most efficient way to execute a given query by considering the possible query plans. For example, the query optimizer 214 determines that a composite key index 217 may be used to process the query most efficiently. The query optimizer 214 may then further analyze a cardinality, or number of unique values, of one or more pre-order columns in the composite key index 217, in order to determine whether to process the query using the merge module 215 to search and order query results. Generally, the query optimizer 214 determines whether the cardinality of the pre-order columns is sufficiently small, such that invoking the merge module 215 would provide a performance advantage relative to a traditional column sort. In one embodiment, the query optimizer 214 may compute a ratio of the cardinality of the pre-order columns to a total count of rows in the relevant database table upon which the composite key index 217 is built. If the ratio is lower than a predefined threshold, the query optimizer 214 may use the merge module 215 to process the query. In another embodiment, the query optimizer 214 may consider whether the cardinality of the pre-order columns is lower than a predefined threshold. For example, if there are only 10 unique values in a pre-order column, and the threshold is 20 unique values, the query optimizer 214 may use the merge module 215 to process the query.

The merge module 215 is a component of the DBMS 212 configured to provide composite index merge ordering. Generally, the merge module 215 is configured to leverage the fact that, for result sets returned by searching a composite key index 217, the values of the second key column (the ordering column) is ordered for each unique value of the first key column (the pre-order column). More generally, the last m+1 to n key columns are ordered within each 1 to m key column unique values, producing a number of sorted sub-lists. The merge module 215 (or a designated component of the DBMS 212) may search the composite key index 217 to retrieve the first result for each unique value from the first m key columns (the pre-order columns). Generally, the merge module 215 may retrieve and return additional values from the index 217 or underlying database columns, however, these results are not discussed for the sake of clarity. The results retrieved for each unique pre-order column value include the "first" ordering key value (based on sorting criteria), as the ordering column values are ordered for each unique pre-order column value. The merge module 215 may store the retrieved results in an ordering list in order to return ordered results to the user. The merge module 215 may then select a "winning" ordering key value (i.e., the first value based on sorting criteria) from the ordering list, which may be returned as the first query result and outputted to the user. The merge module 215 may then replace the "winner" in the ordering list with a "second" ordering key value. The second ordering key value shares the same unique pre-order column value as the winner (the previously returned ordering key value). The merge module 215 may again select another "winner" from the ordering list based on sorting criteria (and excluding the returned value), and return this new winner as the second result to the user.

The merge module 215 may perform subsequent iterations of this process until a predefined number of results are returned to the user. The predefined number of results may be any number, such as a number of results sufficient to fill a single page of results when displayed on a screen. If the user issues a request to view more results, the merge module 215 may then generate another result set. The merge module 215 may proactively fill a buffer (not shown) of results in order to responsively fulfill user requests to view more results.

As shown, the storage 108 includes one or more databases 216. The database 216 is generally a collection of data that is organized according to a schema. The storage 108 may include one or more composite key indexes 217, which are storage structures used to enhance performance in accessing the database 216. Specifically, the composite key indexes 217 may improve the speed of data retrieval operations on a database table at the cost of additional writes and the use of more storage space to maintain the extra copy of data. The composite key indexes 217 may be built according to two or more keys, such as the city column 101 and the MemberID column 102 of FIG. 1A. Although shown as external to the database 216, the composite key indexes 217 may be stored in the database 216.

As shown, a plurality of client computers 250 may use a database interface 260 to access the database 216. The database interface may 260 may include, but is not limited to, a command line interface, a program interface, or a web interface.

Figure 3:
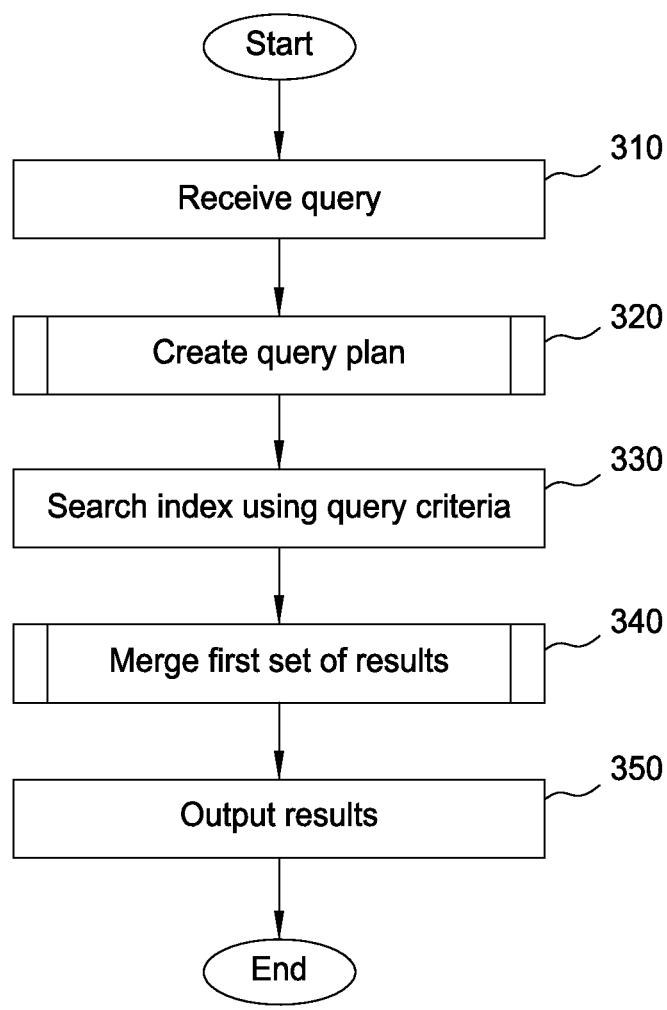
FIG. 3 illustrates a method to provide index merge ordering, according to one embodiment.

FIG. 3 illustrates a method 300 to provide index merge ordering, according to one embodiment. Generally, the steps of the method 300 allow a DBMS, such as the DBMS 212, to utilize a composite database index to search and order query results. At step 310, the DBMS 212 may receive a query. The query may be any type of query. Generally, the DBMS 212 may receive the query from a user or application though the DB interface 260. At step 320, described in greater detail with reference to FIG. 4, the DBMS 212 (and/or the query optimizer 214) may create a query plan. The query plan may generally specify the most efficient way to process the query. For example, the DBMS 212 may determine that due to the low cardinality of a pre-order key in a composite database index 217, the composite index 217 should be used to both search and sort the results. At step 330, the DBMS 212 may search the index 217 according to the criteria specified in the query. For example, if the query specifies "WHERE first_name IN('Mike','Rob','Tom'), order by birthdate" the DBMS 212 may probe the index 217 for entries matching the specified first names. In doing so, the DBMS 212 may receive a set of results ordered similar to the depiction in FIG. 1A, where a plurality of different entries include the first names Mike, Rob, and Tom. Furthermore, if the index is a composite index 217 built on the first_name and birthdate columns, the index 217 will return three sub-lists, one for each unique first name Mike, Rob, and Tom. The birthdate values within each sub-list will be sorted in ascending order.

At step 340, the DBMS 212 (and/or the merge module 215) may merge a first set of results, namely the sub-lists returned from probing the composite index 217. The merging is described in greater detail with reference to FIG. 5. Generally, the merge module 215 receives a first unique value from each sub-list, identifies the "winner" based on sorting criteria, and returns that winner as the first result responsive to the query. The merge module 215 may then replace the winner with the next result from the winner's sub-list, and return a second winner as the second result responsive to the query. The merge module 215 may continue this process until a first set of results (such as a first page) is returned. At step 350, the DBMS 212 may output the results for display.

Figure 4:
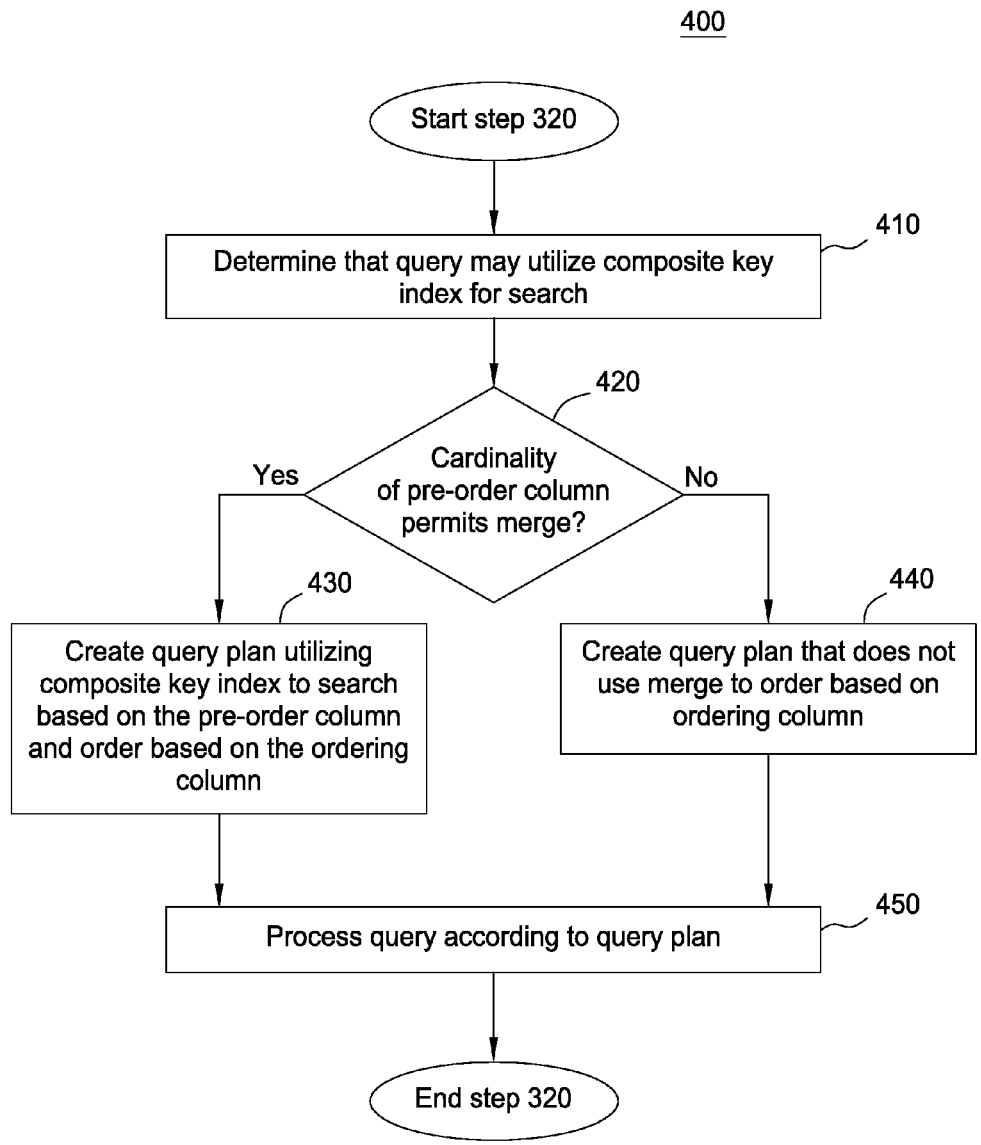
FIG. 4 illustrates a method to create a query plan implementing index merge ordering, according to one embodiment.

FIG. 4 illustrates a method 400 corresponding to step 320 to create a query plan implementing index merge ordering, according to one embodiment. Generally, the steps of the method 400 allow the query optimizer 214 to determine whether merge processing by the merge module 215 would be efficient relative to traditional techniques. At step 410, the query optimizer 214 determines that the query received at step 310 may utilize a composite key index 217 for search purposes. Generally, in making this determination, the query optimizer 214 may determine that accessing the index 217 to search the database data would be faster than searching the underlying data columns directly. At step 420 the query optimizer 214 may determine whether the cardinality of the pre-order column(s) of the composite key index 217 permit the merge process. Generally, the query optimizer 214 must determine whether the number of unique values in the pre-order column is sufficiently small such that a sort would be efficient relative to conventional search and sort techniques. In one embodiment, the query optimizer 214 may determine whether the cardinality is below a specified cardinality threshold. In another embodiment, the query optimizer 214 may determine whether a ratio of the cardinality to the total number of rows is lower than a second threshold.

If the query optimizer 214 determines that the cardinality of the pre-order column permits merger, the query optimizer 214 proceeds to step 430, otherwise, the query optimizer 214 proceeds to step 440. At step 430, the query optimizer 214 may create a query plan utilizing the composite key index 217 to search based on the pre-order column and order based on the ordering column of the composite key index 217. At step 440, the query optimizer 214 may create a query plan that does not use the merge techniques based on the ordering column of the composite index 217, as the merge process may not be efficient based on the cardinality of the pre-order columns. At step 450, the DBMS may process the query according to the query plan generated by the query optimizer 214.

Figure 5:
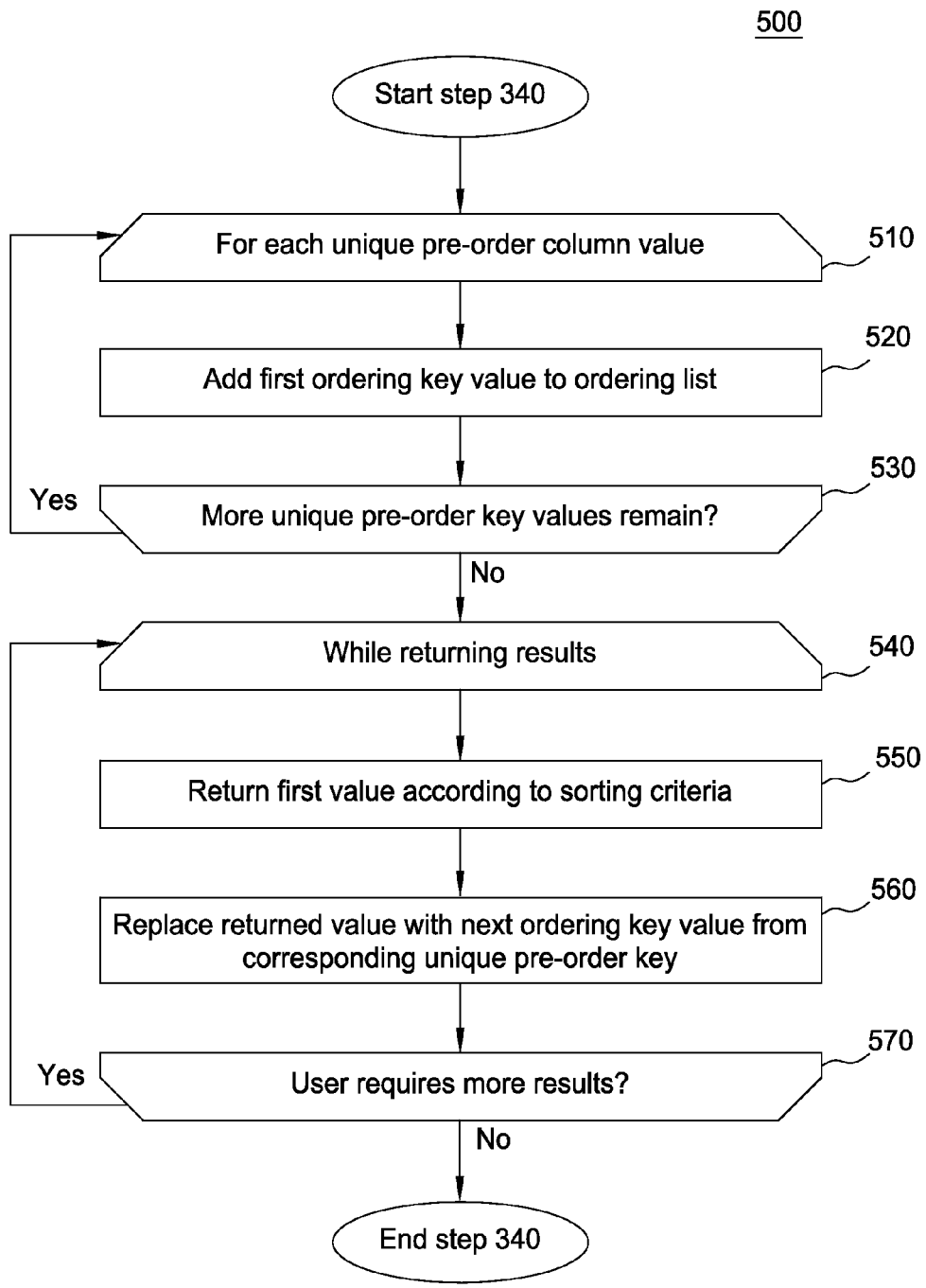
FIG. 5 illustrates a method to merge a first set of results, according to one embodiment.

FIG. 5 illustrates a method 500 corresponding to step 340 to merge a first set of results, according to one embodiment. Generally, the steps of the method 500 return a set of results that are produced as a result of searching a composite index 217 based on a pre-order column, and ordered based on the order column of the composite index 217. In at least some embodiments, the DBMS 212 and/or the merge module 215 perform the steps of the method 500. At step 510, the merge module 215 executes a loop including steps 520-530 for each unique pre-order column value. At step 520, the merge module 215 may add a first ordering key value, corresponding to the first unique pre-order column value, to a temporary ordering list. For example, referring back to FIG. 1A, the merge module 215 may add 'Rochester' '10201', 'Chapel Hill' '09184', 'Apex' '09999', and 'Armonk' '01010' to the ordering list (in successive iterations of step 520). Each of these value pairs corresponds to the first entry for each unique value in the pre-order column list (i.e, the city column). At step 530, the merge module 215 may determine whether more unique pre-order values remain. If more values remain, the merge module 215 returns to step 510. If no unique pre-order column values remain, the merge module 215 proceeds to step 540.

At step 540, the merge module 215 executes a loop including steps 550-570 for each result being returned to the user as responsive to the query. At step 550, the merge module 215 may return the first value (according to the ordering criteria) in the ordering list generated at step 520 as the first result responsive to the query. For example, since '01010' is the lowest MemberID, this value (possibly along with 'Armonk' and any other relevant attributes included in the row of data), may be returned to the user. At step 560, the merge module 215 may replace the value returned at 550 in the ordering list with the next ordering column value from the sub-list that corresponds to the unique pre-ordering value of the returned value. For example, 'Armonk' '010101' may be replaced in the ordering list with '10002'. At step 570, the merge module 215 may determine whether the user requires more results. Generally, the merge module 215 may be configured to initially return a predefined number of results. However, the user may request additional results. If the predefined number of results has not been returned (such as a full page of results), or the user requests additional results, the merge module 215 returns to step 540. If, however, a full set of results has been returned, and the user does not request results, the method 500 ends.

Advantageously, embodiments disclosed herein allow composite indexes to satisfy search and ordering purposes for queries that are currently limited in such a capacity. Specifically, embodiments disclosed herein leverage the fact that for a composite index, any results returned will have a plurality of sorted sub-lists, with each sub-list corresponding to a unique key in a pre-order column. By merging the sub-lists, embodiments disclosed herein may return a first set of results to a user that were both searched and ordered based using the composite index, which may provide more efficient performance than traditional methods of processing queries.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present disclosure, a user may access applications or related data available in the cloud. For example, the DBMS 212 could execute on a computing system in the cloud and use composite indexes for search and ordering. In such a case, the DBMS 212 could receive queries and store result sets ordered by ordering column values at a storage location in the cloud. Doing so allows a user to access this information from any computing system attached to a network connected to the cloud (e.g., the Internet).

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A method to order query results, comprising:
   processing a received query at least in part using a composite key index, wherein the composite key index comprises at least two key columns, wherein the at least two key columns comprise at least one pre-ordering column and an ordering column, wherein the query specifies ordering criteria to order a result set based on values of the ordering column, by:
   receiving, from the composite key index, an ordering column value for each unique pre-ordering column value in the composite key index;
   identifying a first ordering column value as being ordered first according to the ordering criteria;
   returning the first ordering column value as being responsive to the query;
   replacing, in a list of the ordering column values received from the composite key index, the first ordering column value with a second ordering column value received from the composite key index, the second ordering column value sharing the unique pre-ordering column value of the first ordering column value;
   identifying a next ordering column value as being ordered first among the ordering column values in the list according to the ordering criteria; and
   returning the next ordering column value as being responsive to the query.

2. The method of claim 1, further comprising:
   prior to processing the query:
   determining a cardinality of the unique pre-ordering column values; and
   determining that a ratio of the cardinality to a count of rows in a database table upon which the composite key index is built is lower than a predefined threshold.

3. The method of claim 1, wherein a first set of ordering column values are returned, wherein a count of the ordering column values in the first set comprises a predefined number of ordering column values, wherein the first set of ordering column values is ordered according to the ordering criteria.

4. The method of claim 3, wherein a second set of ordering column values is returned responsive to user input specifying to return additional ordering column values.

5. The method of claim 1, wherein ordering column values are received for each unique pre-ordering column value matching a selection criteria specified in the query.

6. The method of claim 1, wherein the query is processed according to a query execution plan specifying to process the query at least in part using the composite key index.

7. A method, comprising:
   processing a received query at least in part using a composite key index, wherein the composite key index comprises at least two key columns, wherein the at least two key columns comprise at least one pre-ordering column and an ordering column, wherein the query specifies ordering criteria to order a result set based on values of the ordering column, by:
   receiving, from the composite key index, an ordering column value for each unique pre-ordering column value in the composite key index;
   identifying, in a list of the ordering column values received from the composite key index, a first ordering column value as being ordered first according to the ordering criteria;
   returning the first ordering column value as being responsive to the query;
   replacing the first ordering column value in the list with a second ordering column value received from the composite key index, the second ordering column value sharing the unique pre-ordering column value of the first ordering column value;

identifying a next ordering column value as being ordered first among the ordering column values in the list according to the ordering criteria; and returning the next ordering column value as being responsive to the query.

8. The method of claim 7, further comprising:

prior to processing the query:

determining a cardinality of the unique pre-ordering column values; and determining that a ratio of the cardinality to a count of rows in a database table upon which the composite key index is built is lower than a predefined threshold.

9. The method of claim 7, wherein a first set of ordering column values are returned, wherein a count of the ordering column values in the first set comprises a predefined number of ordering column values, wherein the first set of ordering column values is ordered according to the ordering criteria.

10. The method of claim 9, wherein a second set of ordering column values is returned responsive to input specifying to return additional ordering column values.

11. The method of claim 7, wherein ordering column values are received for each unique pre-ordering column value matching a selection criteria specified in the query.

12. The method of claim 7, wherein the query is processed according to a query execution plan specifying to process the query at least in part using the composite key index.

* * * * *